United States Patent [19]

Rivera

[11] Patent Number: 4,930,823
[45] Date of Patent: Jun. 5, 1990

[54] VEHICLE BUMPER

[76] Inventor: David Rivera, 18 Van Wert La., Walden, N.Y. 12586

[21] Appl. No.: 381,986

[22] Filed: Jul. 19, 1989

[51] Int. Cl.$^5$ .............................................. B60R 19/20
[52] U.S. Cl. .................................. 293/107; 293/120; 293/133; 293/137
[58] Field of Search ............... 293/107, 132, 133, 135, 293/136, 137, 134, 120; 267/139, 140, 166, 33, 34, 35

[56] References Cited

U.S. PATENT DOCUMENTS

| | | | |
|---|---|---|---|
| 1,519,967 | 12/1924 | Hughes | 293/107 |
| 1,935,447 | 11/1933 | Hoffman | 293/107 |
| 2,202,460 | 5/1940 | Maciel | 293/107 |
| 2,236,507 | 4/1941 | Kreitz | 293/107 |
| 2,890,904 | 6/1959 | Materi | 293/107 |
| 3,841,683 | 10/1974 | Toro | 293/136 |
| 3,887,223 | 6/1975 | Bez | 293/133 |
| 4,176,858 | 12/1979 | Kornhauser | 293/107 |
| 4,411,462 | 10/1983 | Buehrig et al. | 293/134 |

*Primary Examiner*—Margaret A. Focarino
*Assistant Examiner*—Gary C. Hoge
*Attorney, Agent, or Firm*—Jerry T. Kearns

[57] ABSTRACT

A vehicle bumper includes an elongated shell member for attachment to an end portion of a vehicle. An impact member is received within the shell member for limited lateral sliding movement and is biased outwardly through an elongated opening in the shell member. A coil spring biases the impact member outwardly from the shell member and a shock absorber dampens lateral movement of the impact member. An air bag is received in an outwardly opening elongated cavity in the impact member and is inflatable upon a severe impact. A resilient cover which surrounds the impact member and encloses the air bag includes a pair of inwardly extending elongated ribs in frictional engagement with a pair of parallel grooves provided in an outer portion of the impact member. The cover has a padded outer portion for absorbing minor impacts and is released from engagement with the impact member upon inflation of the air bag. An air spoiler may be secured to the shell member.

8 Claims, 3 Drawing Sheets

VEHICLE BUMPER

BACKGROUND OF THE INVENTION

1. Field of the Invention

The present invention relates to vehicle bumpers, and more particularly pertains to a vehicle bumper which includes a resilient padded cover for absorbing minor impacts, a shock absorber for absorbing intermediate impacts, and an air bag which is inflatable upon a severe impact. Various forms of vehicle bumpers have been proposed for protecting vehicle occupants from crash forces. Many of these bumpers have a collapsible force absorbent construction to absorb impact forces, but are relatively expensive because the bumper is severely damaged by even minor impacts. In order to overcome this problem, the present invention provides a safety bumper system which includes three diverse shock absorbing systems for absorbing various degrees of impact forces, without incurring expensive structural damage.

2. Description of the Prior Art

Various types of vehicle bumpers are known in the prior art. A typical example of such a vehicle bumper is to be found in U.S. Pat. No. 1,519,967, which issued to A. Hughes on Dec. 16, 1924. This patent discloses an elongated cylindrical bumper having a resilient outer portion and including a constantly pressurized pneumatic tube. U.S. Pat. No. 1,935,447, which issued to O. Hoffman on Nov. 14, 1933, discloses a pneumatic bumper including a pneumatic tube secured to a vehicle frame by a spring steel shock absorbing structure. U.S. Pat. No. 2,202,460, which issued to F. Maciel on May 28, 1940, discloses a pneumatic vehicle bumper adapted for mounting along side portions of a vehicle. U.S. Pat. No. 2,236,507, which issued to A. Kreitz on Apr. 1, 1941, discloses a pneumatic bumper including a constantly pressurized pneumatic tube. U.S. Pat. No. 2,890,904, which issued to A. Materi on June 16, 1959, discloses a pneumatic vehicle bumper having accordion fold resilient shock absorbing sections.

While the above mentioned devices are directed to vehicle bumpers, none of these devices disclose a vehicle bumper including three separate impact absorbing systems for dampening slight, moderate and severe impact forces. Additional features of the present invention, not contemplated by the aforesaid prior art devices include the provision of an air bag in an impact member which is inflatable upon a severe impact, a resilient cover which is released from engagement with the impact member upon inflation of the air bag, and the slidable mounting of the impact member by a shock absorber within a fixed shell member. Inasmuch as the art is relatively crowded with respect to these various types of vehicle bumpers, it can be appreciated that there is a continuing need for and interest in improvements to such vehicle bumpers, and in this respect, the present invention addresses this need and interest.

SUMMARY OF THE INVENTION

In view of the foregoing disadvantages inherent in the known types of vehicle bumpers now present in the prior art, the present invention provides an improved vehicle bumper. As such, the general purpose of the present invention, which will be described subsequently in greater detail, is to provide a new and improved vehicle bumper which has all the advantages of the prior art vehicle bumpers and none of the disadvantages.

To attain this, representative embodiments of the concepts of the present invention are illustrated in the drawings and make use of a vehicle bumper which includes an elongated shell member for attachment to an end portion of a vehicle. An impact member is received within the shell member for limited lateral sliding movement and is biased outwardly through an elongated opening in the shell member. A coil spring biases the impact member outwardly from the shell member and a shock absorber dampens lateral movement of the impact member. An air bag is received in an outwardly opening elongated cavity in the impact member and is inflatable upon a severe impact. A resilient cover which surrounds the impact member and encloses the air bag includes a pair of inwardly extending elongated ribs in frictional engagement with a pair of parallel grooves provided in an outer portion of the impact member. The cover has a padded outer portion for absorbing minor impacts and is released from engagement with the impact member upon inflation of the air bag. An air spoiler may be secured to the shell member.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicle bumper which has all the advantages of the prior art vehicle bumpers and none of the disadvantages.

It is another object of the present invention to provide a new and improved vehicle bumper which may be easily and efficiently manufactured and marketed.

It is a further object of the present invention to provide a new and improved vehicle bumper which is of a durable and reliable construction.

An even further object of the present invention is to provide a new and improved vehicle bumper which is susceptible of a low cost of manufacture with regard to both materials and labor, and which accordingly is then susceptible of low prices of sale to the consuming public, thereby making such vehicle bumpers economically available to the buying public.

Still yet another object of the present invention is to provide a new and improved vehicle bumper which provides in the apparatuses and methods of the prior art some of the advantages thereof, while simultaneously overcoming some of the disadvantages normally associated therewith.

Still another object of the present invention is to provide a new and improved vehicle bumper for protecting vehicle occupants from severe impacts.

Yet another object of the present invention is to provide a new and improved vehicle bumper including independent impact force absorbing systems for dampening slight, moderate and severe impact forces without incurring expensive structural damage.

Even still another object of the present invention is to provide a new and improved vehicle bumper which includes an air bag mounted in an impact member for inflation upon a severe impact.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
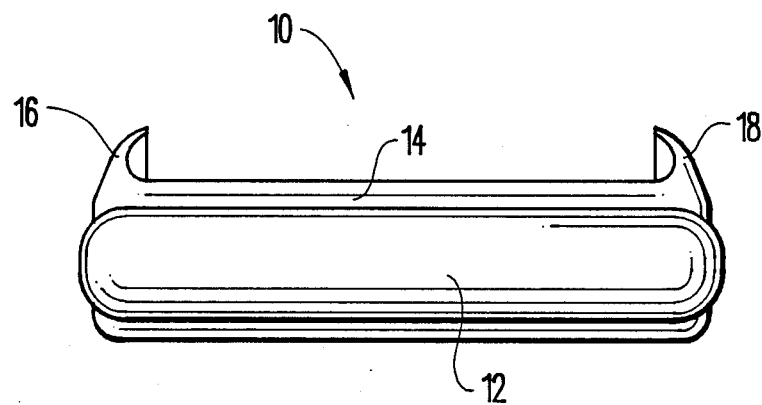
FIG. 1 is a front view of a vehicle bumper according to a first embodiment of the present invention.

With reference now to the drawings, and in particular to FIG. 1 thereof, a new and improved vehicle bumper embodying the principles and concepts of the present invention and generally designated by the reference numeral 10 will be described.

More specifically, it will be noted that the first embodiment 10 of the invention includes a base or shell member 14 including right angular side portions 16 and 18 for securement to a stationary frame portion of a vehicle. An impact member covered by a resilient cover 12 is mounted through an outwardly directed elongated opening provided in an outer face of the shell member 14.

Figure 2:
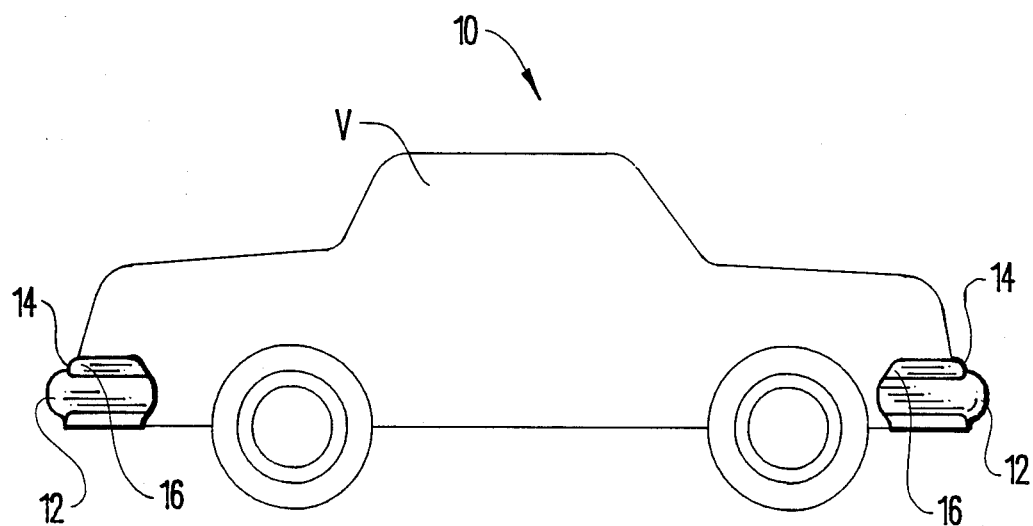
FIG. 2 is a side view illustrating a vehicle provided with bumpers according to the first embodiment of the present invention.

As shown in FIG. 2, the bumpers 10 may be mounted on the front and rear ends of a conventional vehicle V, by conventional threaded fasteners to vehicle frame portions. It should be noted that a variety of mounting brackets may be employed for mounting the stationary shell members 14 on end frame portions of a variety of different vehicles.

Figure 3:
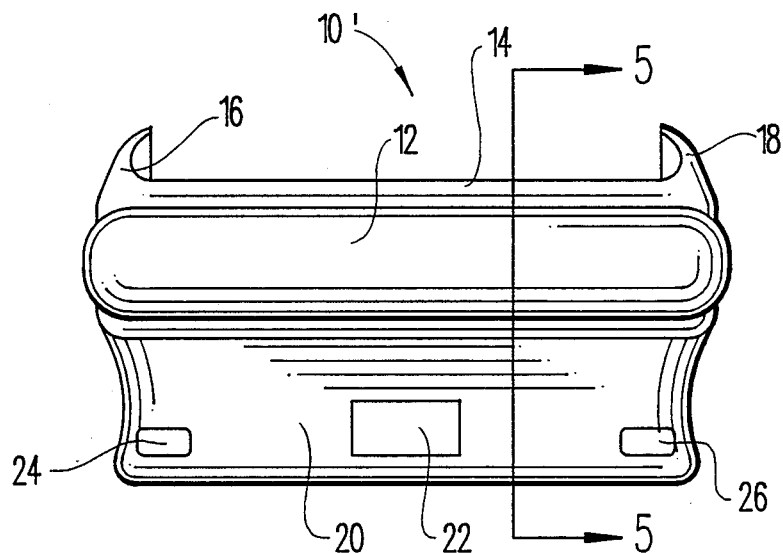
FIG. 3 is a front view illustrating a vehicle bumper according to a second embodiment of the present invention, including an attached air spoiler.

FIG. 3 illustrates a second embodiment 10' of the invention, constructed similarly to the first embodiment illustrated in FIGS. 1 and 2, with the addition of an air spoiler 20. The air spoiler 20 may be formed from sheet metal, plastic or a resilient rubber material, and may include fog or signal lights 24 and 26, and a license plate mounting bracket 22.

Figure 4:
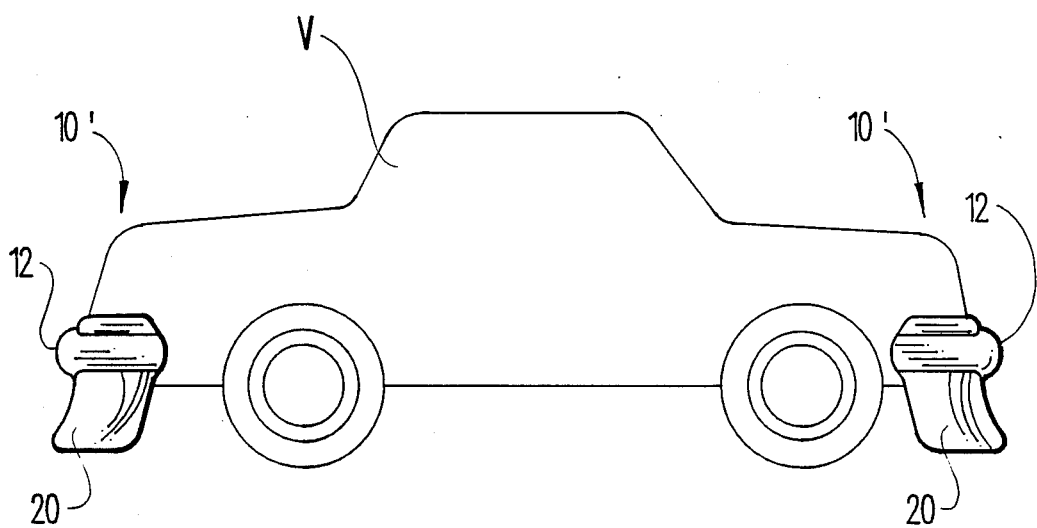
FIG. 4 is a side view illustrating a vehicle provided with bumpers according to the second embodiment of the present invention.

FIG. 4 illustrates the bumpers 10' illustrated at front and rear end portions of a vehicle V.

Figure 5:
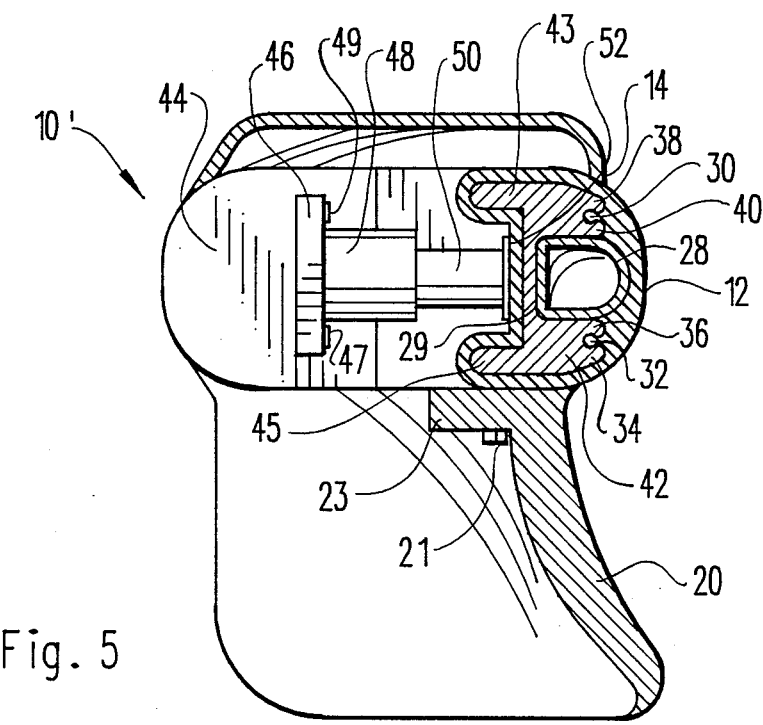
FIG. 5 is a transverse cross sectional view, taken along line 5—5 of FIG. 3.

FIG. 5 is a transverse cross sectional view, taken along line 5—5 of FIG. 3, which illustrates the internal constructional details of the bumper 10', which are substantially similar to the construction features of the first embodiment 10. The spoiler 20 is secured to a lower portion of the stationary shell member 14 by conventional threaded fasteners 21 and includes a mounting flange 23. The shell or base member 14 has a hollow interior portion in which an impact member 42 is mounted for limited linear lateral reciprocal sliding movement. The impact member 42 has an outer portion which extends outwardly through an elongated outwardly facing opening in the shell member 14. As shown, the outer portion of the impact member 42 is tapered to a reduced width, which prevents the impact member 42 from moving entirely outwardly from the shell member 14. The impact member 42 includes outer bifurcated portions 38, 40 and 34, 36 which define elongated parallel grooves, each having a circular undercut portion for snap-type frictional engagement with elongated inwardly extending parallel ribs 30 and 32, provided on a resilient cover 12, preferably formed from a rubber material. The cover 12 has a padded front portion for absorbing minor impact forces and encloses an air bag 28. The air bag 28 is of a conventional type which is inflated upon a severe impact. The air bag 28 may be controlled by a conventional inertial switch and inflated from a pressurized cylinder. The air bag 28 is disposed in an elongated cavity 29 formed in the outer portion of the impact member 42. The air bag 28 is of an elongated construction and extends along the entire length of the impact member 42. A pair of telescoping sleeves 48 and 50 enclose a coil spring and a shock absorber for outwardly biasing the impact member 42 and for dampening lateral sliding movement thereof. A base plate 46 is secured by threaded fasteners 47 and 48 to a stationary mounting block portion 44 of the shell 14. A similar mounting plate 52 is in abutment with an inner surface of the impact member 42.

Figure 6:
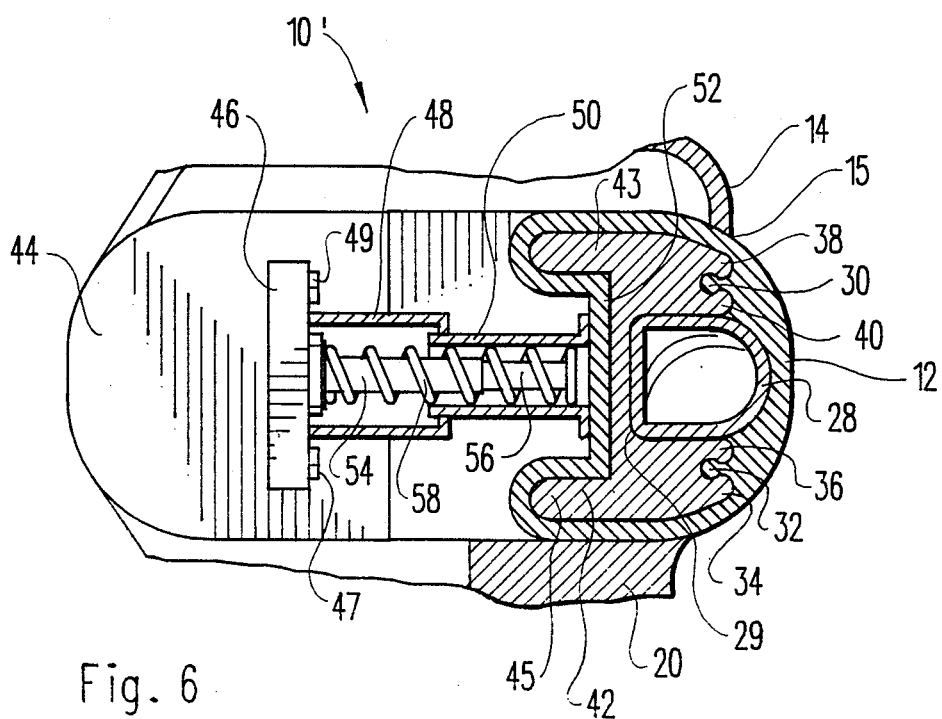
FIG. 6 is an enlarged cross sectional detail view further illustrating the construction of the vehicle bumper of the present invention.

FIG. 6 illustrates the coil spring 58 which surrounds telescopic portions 54 and 56 of a conventional gas filled shock absorber. It should be noted that a plurality of spring and shock absorber assemblies may be spaced along the length of the impact member 42, within the shell 14. The resilient cover 12 absorbs minor bumps and impacts, such as are incurred at low speeds in parking lots and other situations. The shock absorber 54, 56 and spring 58 allow inward dampened lateral movements of the impact member 42, to absorb moderate impact forces, without deployment of the air bag 28. Upon a relatively severe impact, the air bag 28 is inflated by a conventional inertial switching mechanism from a compressed gas cylinder (not shown) and causes the ribs 30 and 32 of the cover 12 to be disengaged from the impact member 42. The air bag 28 then inflates and, in conjunction with the resilient cover 12, the shock absorber 54, 56 and the spring 58, allows various substantial impact forces to be dampened, without causing severe structural vehicle damage and preventing injury to vehicle occupants.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vehicle bumper, comprising:
a shell member for attachment to an end portion of a vehicle;
said shell member including an elongated hollow body having an elongated outwardly directed opening;
a movable impact member mounted for limited sliding movement within said shell member, said impact member comprising an elongated member having an outer portion dimensioned to extend partially through said outwardly directed opening;
spring means biasing said impact member outwardly from said shell member;
an inflatable air bag in said impact member;
a pair of parallel grooves extending along said outer portion of said impact member; and,
a resilient cover surrounding said impact member, said cover having a pair of inwardly extending ribs in frictional engagement within said parallel grooves.

2. The vehicle bumper of claim 1, further comprising an elongated outwardly opening cavity in said outer portion of said impact member, between said parallel grooves; and,
said air bag disposed in said cavity.

3. A vehicle bumper, comprising:
an elongated hollow shell member having an outwardly directed elongated opening and adapted for securement on an end portion of a vehicle;
an elongated impact member received for limited sliding movement in said shell member, an outer portion of said impact member dimensioned to project for a limited extent through said outwardly directed opening;
spring means outwardly biasing said impact member;
a pair of parallel grooves extending along said outer portion of said impact member;
a forwardly opening elongated cavity in said impact member, between said parallel grooves;
an elongated inflatable air bag in said cavity; and,
a resilient cover surrounding said impact member and enclosing said air bag, said cover having a pair of inwardly extending elongated ribs in frictional engagement within said grooves, said ribs dimensioned for separation from said grooves upon inflation of said air bag.

4. The vehicle bumper of claim 3, wherein said spring means comprises a coil spring.

5. The vehicle bumper of claim 3, further comprising shock absorbing means for dampening sliding movement of said impact member.

6. The vehicle bumper of claim 3, wherein said cover has a padded outer portion to absorb minor impacts.

7. The vehicle bumper of claim 3, wherein said outer portion of said impact member is tapered to a reduced width.

8. The vehicle bumper of claim 3, wherein each of said grooves in said impact member has an enlarged undercut portion dimensioned to retain one of said ribs in snap-type engagement.

* * * * *